April 1, 1930.  W. M. SCHWARTZ ET AL  1,753,070
PANEL ASSEMBLING APPARATUS
Filed May 1, 1928  9 Sheets-Sheet 2
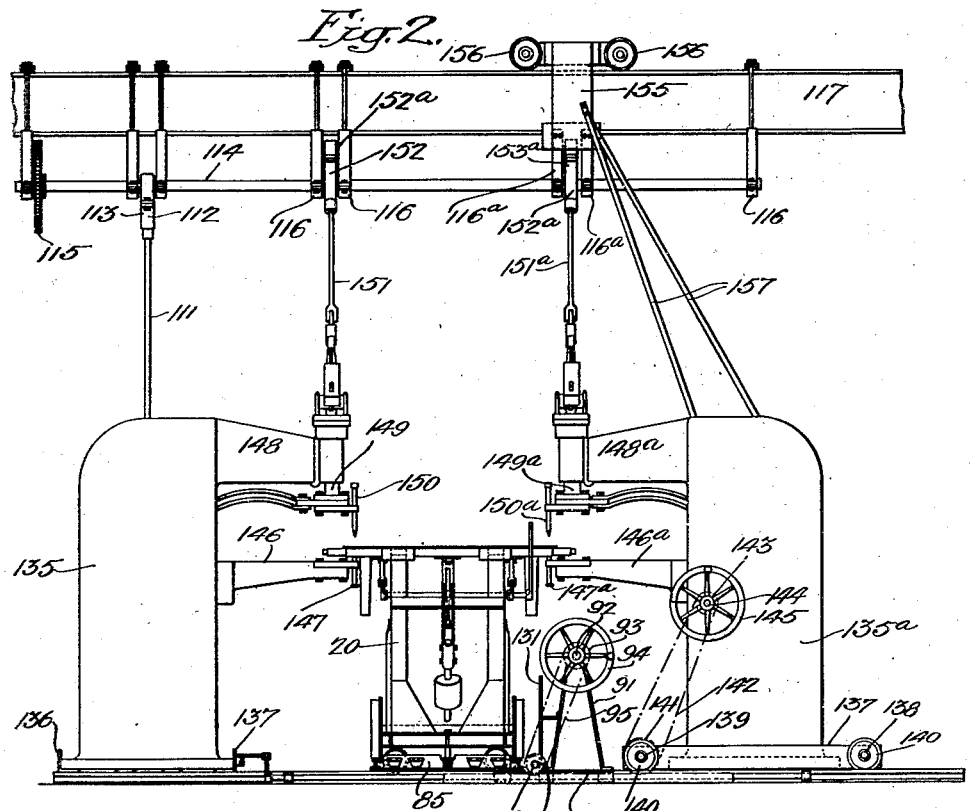
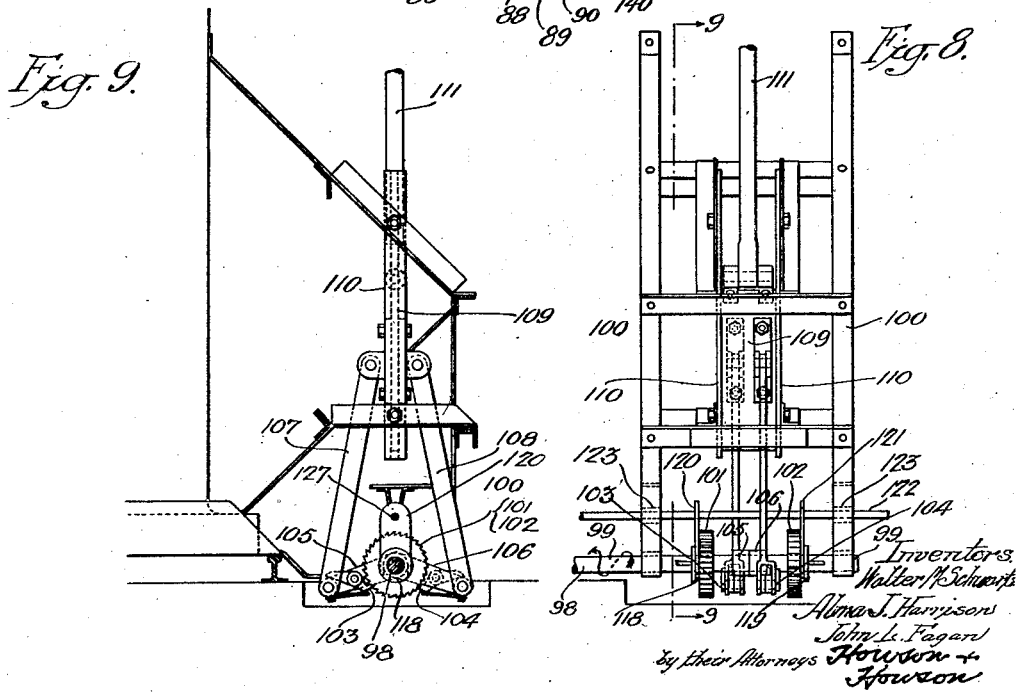

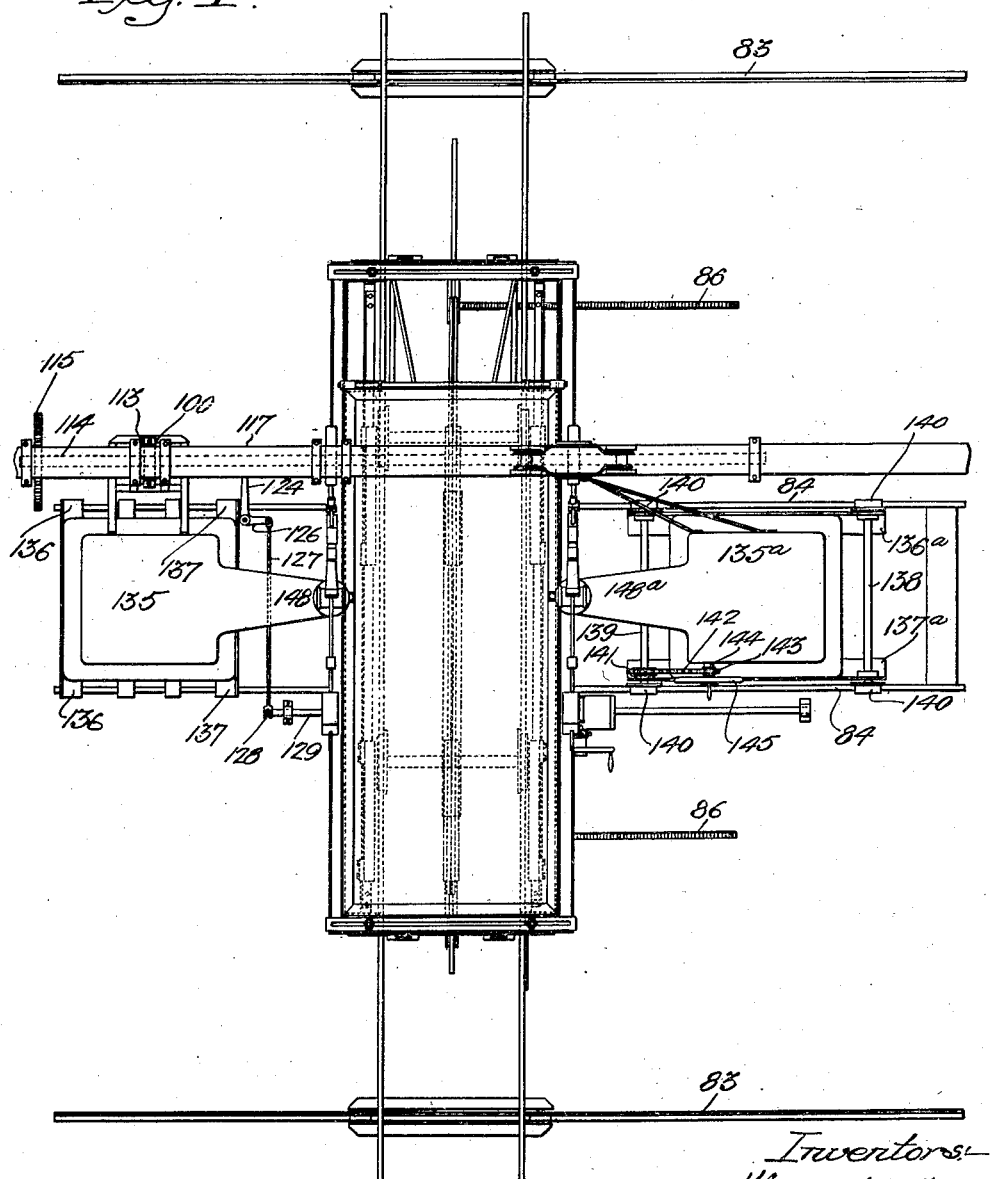

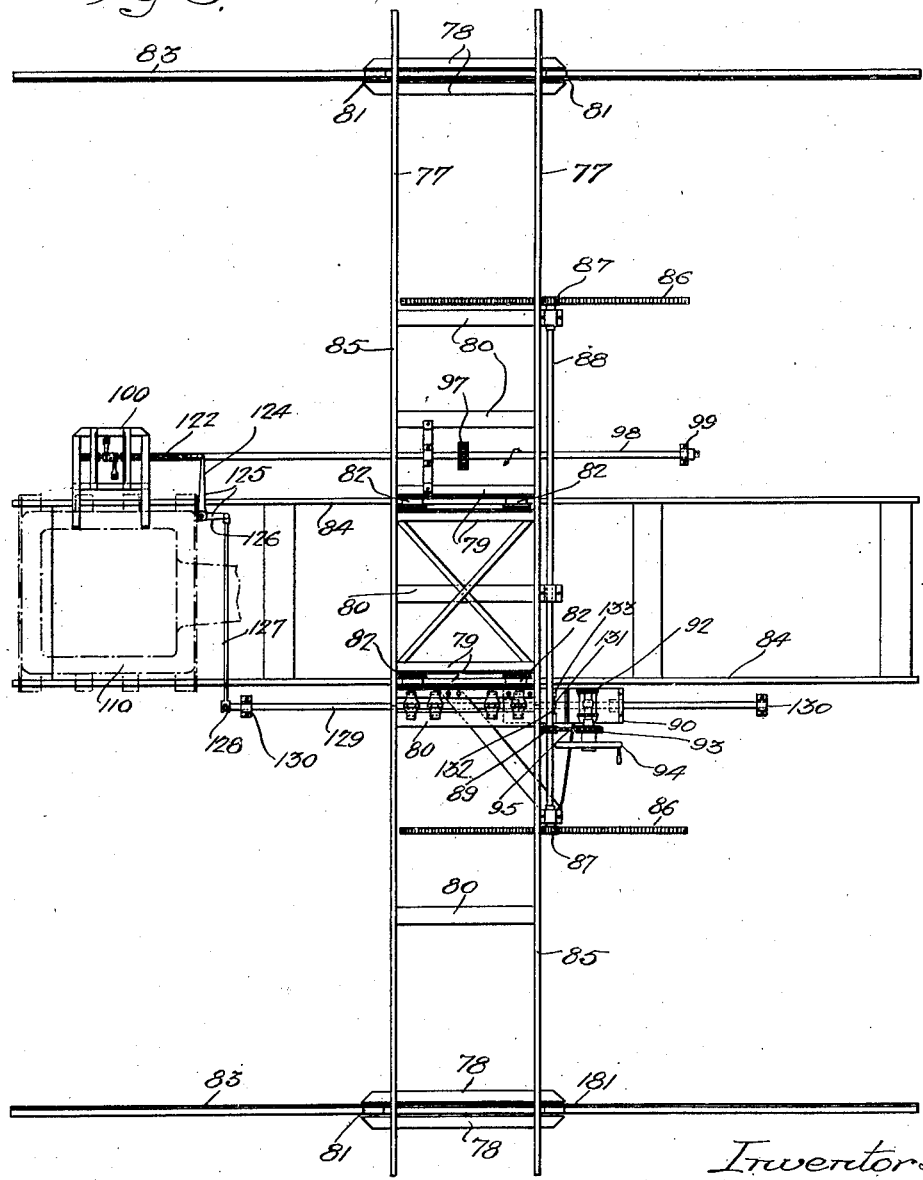

April 1, 1930.  W. M. SCHWARTZ ET AL  1,753,070
PANEL ASSEMBLING APPARATUS
Filed May 1, 1928   9 Sheets-Sheet 4
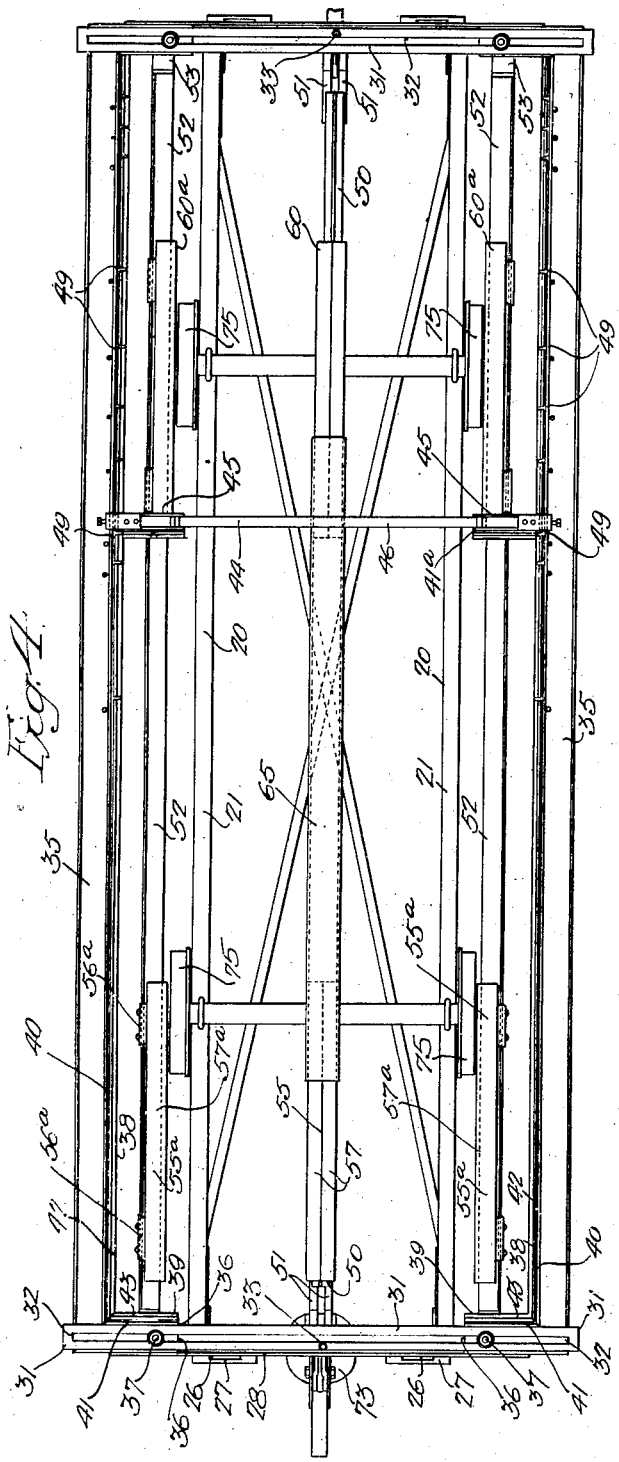

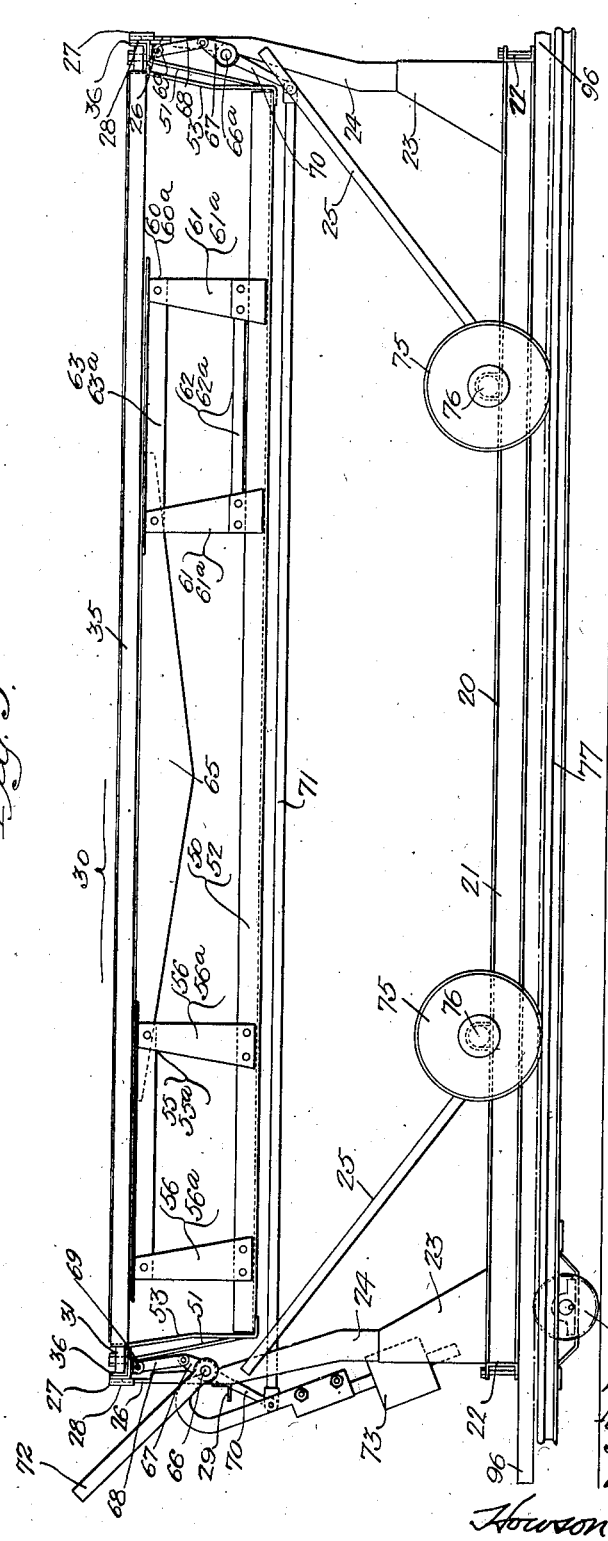

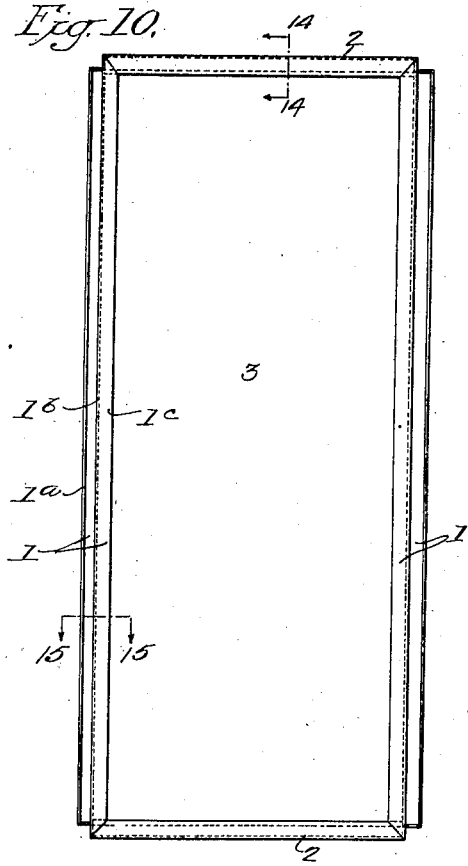
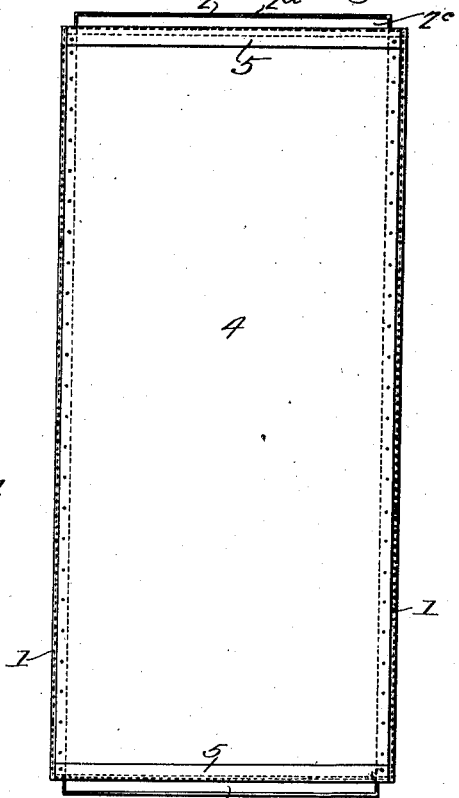
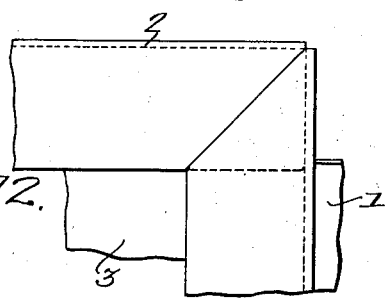
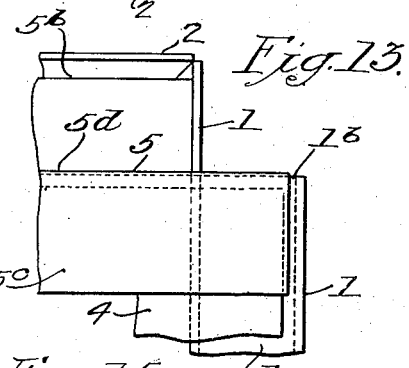
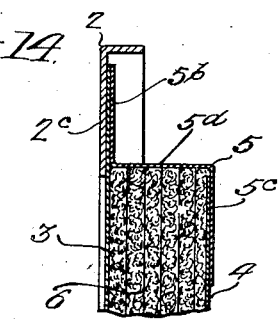
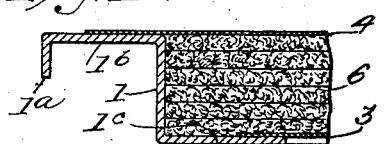

April 1, 1930. W. M. SCHWARTZ ET AL 1,753,070
PANEL ASSEMBLING APPARATUS
Filed May 1, 1928      9 Sheets-Sheet 7
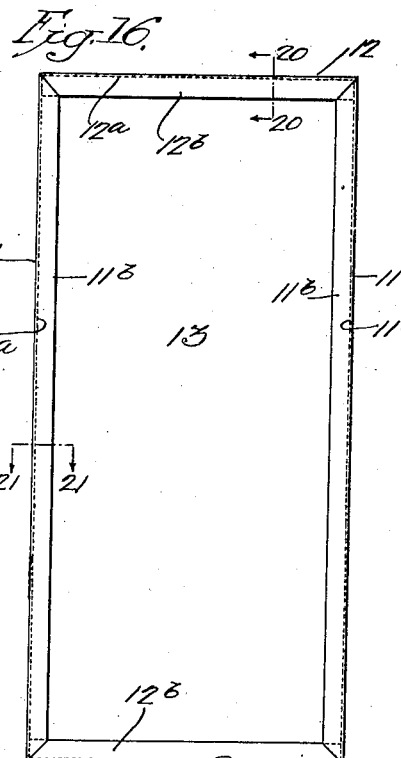
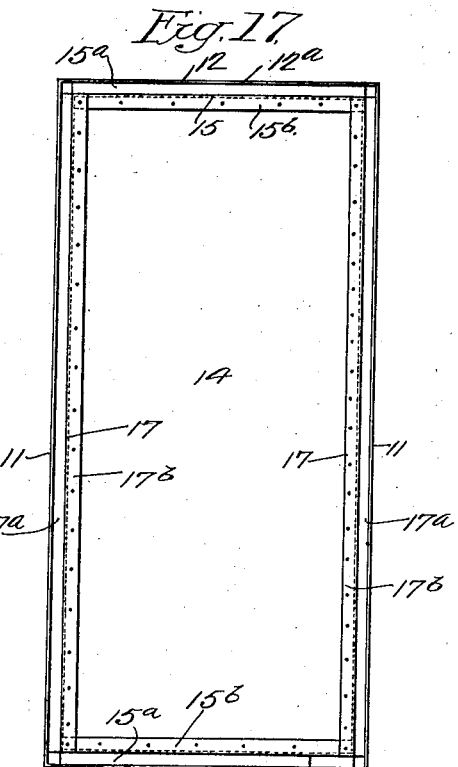
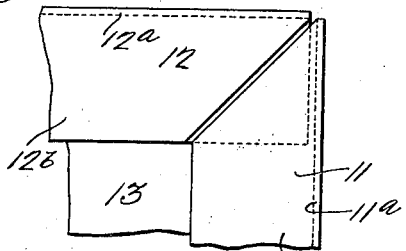
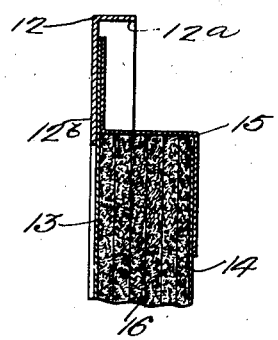
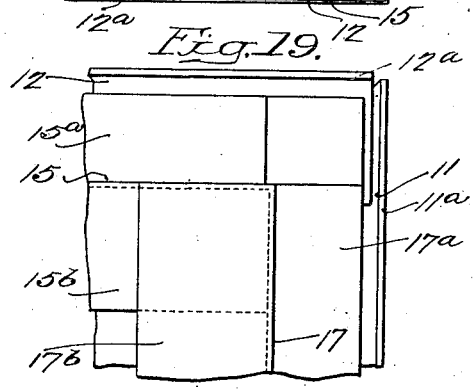
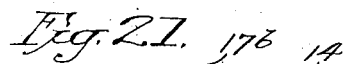
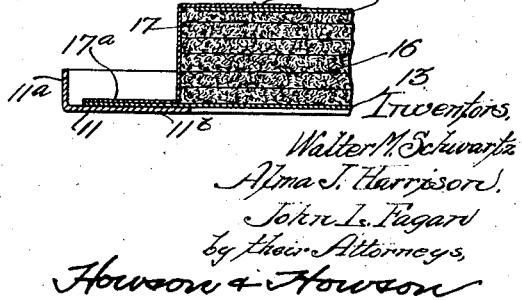

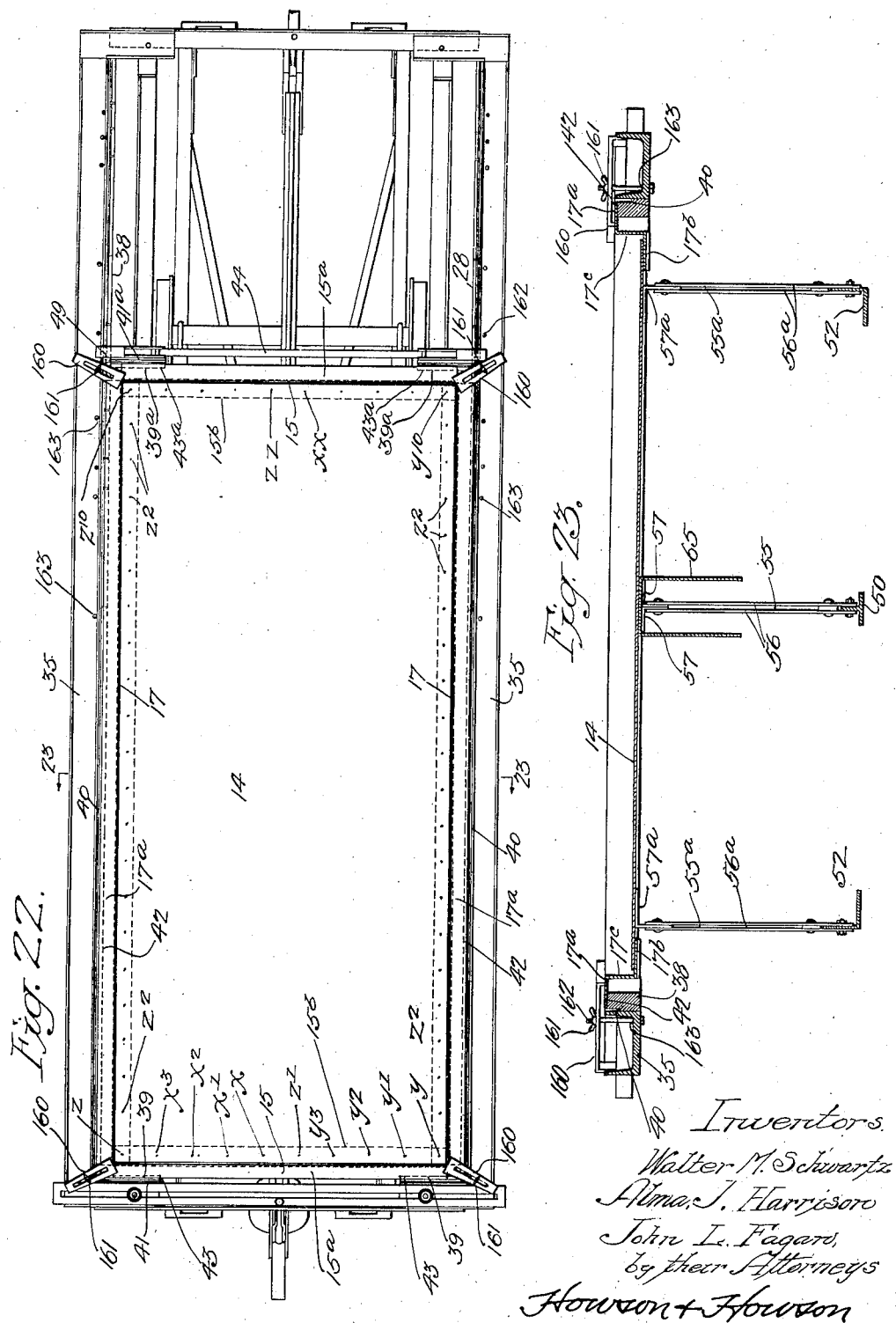

April 1, 1930.    W. M. SCHWARTZ ET AL    1,753,070
PANEL ASSEMBLING APPARATUS
Filed May 1, 1928    9 Sheets-Sheet 9
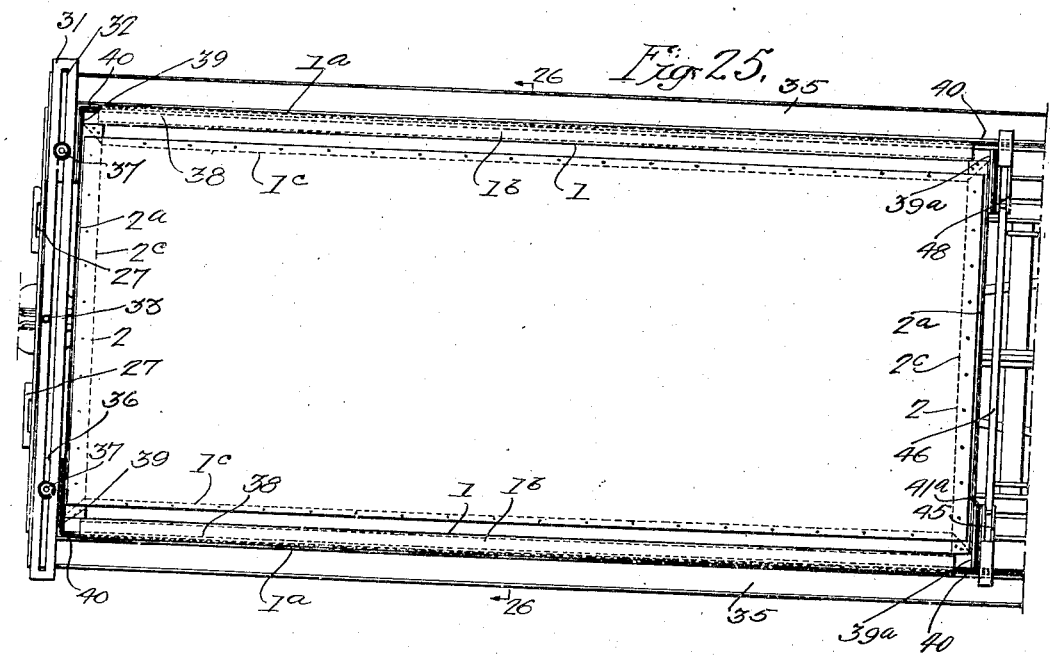
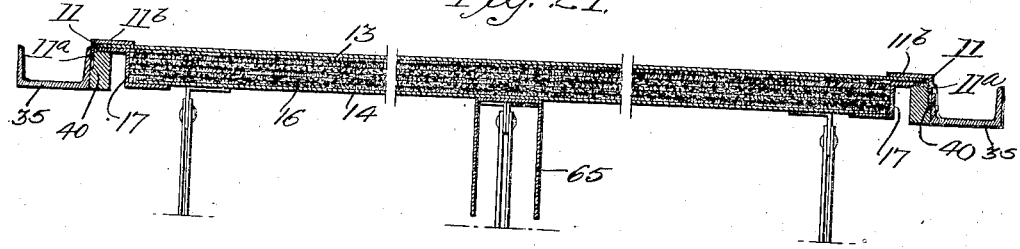
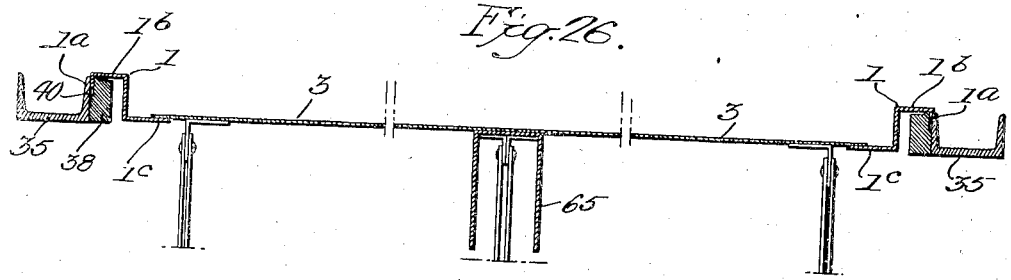

Patented Apr. 1, 1930

1,753,070

UNITED STATES PATENT OFFICE

WALTER M. SCHWARTZ, ALMA J. HARRISON, AND JOHN L. FAGAN, OF PHILADELPHIA, PENNSYLVANIA, ASSIGNORS TO PROCTOR & SCHWARTZ, INCORPORATED, OF PHILADELPHIA, PENNSYLVANIA, A CORPORATION OF PENNSYLVANIA

PANEL-ASSEMBLING APPARATUS

Application filed May 1, 1928. Serial No. 274,309.

This invention relates to means for assembling metal panels, adapted for use in drying apparatus, such as shown and described in the co-pending application of Walter M. Schwartz, Serial Number 294,254, filed July 20, 1928.

The object of the present invention is to provide a table on which the various elements, of which each panel is composed, may be assembled and held in correct relation to each other; and to provide an automatic means for welding these elements at predetermined points to permanently secure the elements together to form a complete integral structure; thereby facilitating the assembling operation and consequently reducing the cost thereof, and assuring that each panel, of a given type, so assembled will correspond to the panels of that type previously and subsequently assembled on our improved apparatus.

Referring to the drawings:

Fig. 1 is a plan view of our improved assembling apparatus;

Fig. 2 is a front elevation of the apparatus;

Fig. 3 is a plan view of the apparatus with the assembling table and the welding units removed;

Fig. 4 is a plan view of the assembling table drawn on an enlarged scale;

Fig. 5 is a side elevation of the table illustrated in Fig. 4;

Fig. 6 is a plan view of a detail of the assembling table, drawn on an enlarged scale;

Fig. 7 is a sectional elevation taken on the line 7—7, Fig. 6;

Fig. 8 is an elevation of a detail of the apparatus;

Fig. 9 is a sectional elevation taken on the line 9—9, Fig. 8;

Fig. 10 is a face view of what may be termed a stationary panel;

Fig. 11 is a rear view of the panel shown in Fig. 10;

Fig. 12 is an enlarged view of the upper right hand corner of the panel as shown in Fig. 10;

Fig. 13 is an enlarged view of the upper right hand corner of the panel as shown in Fig. 11;

Fig. 14 is a sectional view taken on the line 14—14, Fig. 10;

Fig. 15 is a sectional view taken on the line 15—15, Fig. 10;

Fig. 16 is a face view of what may be termed a removable panel;

Fig. 17 is a rear view of the panel shown in Fig. 16;

Fig. 18 is an enlarged view of the upper right hand corner of the panel as shown in Fig. 16;

Fig. 19 is an enlarged view of the upper right hand corner of the panel as shown in Fig. 17;

Fig. 20 is a sectional view taken on the line 20—20 of Fig. 16;

Fig. 21 is a sectional view taken on the line 21—21, Fig. 16;

Fig. 22 is a plan view of the assembling table showing a removable panel in the course of construction;

Fig. 23 is a transverse sectional elevation taken on the line 23—23, Fig. 22;

Fig. 24 is a view similar to Fig. 23 showing the final stage in the assembling of the movable panel;

Fig. 25 is a view similar to Fig. 22, but showing a stationary panel in the course of construction; and Fig. 26 is a transverse sectional elevation taken on the line 26—26, Fig. 25.

The stationary panel shown in Figs. 10 to 15 inclusive comprises a pair of Z bars 1, 1 which form the main longitudinal side members of the panel; a pair of transversely extending L bars 2, 2 which form the main end members of the panel; a face plate 3; a rear plate 4; a pair of transversely extending Z plates 5, 5 which are supplementary to the end bars 2, 2 and are located one at each end of the panel; and a body of insulating material 6 confined between the front plate 3, rear plate 4, side Z bars 1, and end Z plates 5.

The movable panel shown in Figs. 16 to 21 inclusive comprises a pair of L bars 11, 11, which form the main longitudinal side members of the panel; a pair of transversely extending end L bars 12, 12, which form the main end members of the panel; a face plate 13; a rear plate 14; a pair of transversely extending supplementary Z plates 15, 15 located one at each end of the panel; a pair of supplementary Z plates 17, 17 located one at each side of the panel; and a body of insulating material 16 confined between the end and side Z plates 15, 15 and 17, 17 respectively and the face and rear plates 13 and 14 respectively.

The assembling table, as shown in Figs. 4 and 5, comprises a carriage 20, consisting of a pair of longitudinally extending side elements 21, 21 spaced apart by, and suitably secured to, a pair of transversely extending end elements 22, 22. At the junctures of, and secured to, the elements 21, 21 and 22, 22 are angle plates 23, 23, to which are secured vertically extending corner posts 24, 24, suitably braced by angularly extending elements 25, 25.

The upper ends of the corner posts 24, 24 are reduced as illustrated at 26, 26, Figs. 4 and 5, and the tongues thus formed are adapted to fit within slide boxes 27, 27, secured to transversely extending end members 28, 28 of a vertically movable frame 30. A tie bar 29 is secured to and extends transversely between the corner posts 24, 24 at one end of the carriage 20.

Secured, at 33, to each of the end members 28, 28 of the frame 30 is a bar 31, which is slotted adjacent each of its ends as indicated at 32, 32. Longitudinal members 35, 35 extend between the end members 28, 28. Each longitudinal member 35, at each of its ends, is provided with a lateral extension 36, which is adapted to slide between the respective end members 28 and the adjacently positioned slotted bar 31. The extensions 36, 36 are tapped for the reception of securing bolts 37, 37 which pass through the slots 32, 32 in the bars 31, 31. By this means the longitudinal members 35, 35 may be adjusted toward or away from each other and secured in their adjusted positions for purposes hereinafter set forth.

To each of the longitudinal members 35, 35 and the lateral extension 36 at one end thereof is secured a bar 38 and 39 respectively. The bars 38 and 39 are recessed on their sides immediately adjacent the members 35 and their extensions 36, to provide grooves 40 and 41, for purposes hereinafter set forth. Each of these bars 38 and 39 is also recessed on its upper edge as indicated at 42 and 43 respectively, for purposes hereinafter set forth.

Intermediate the slotted bars 31, 31 and extending transversely of the frame 30 is an adjustable cross bar 44, which comprises a head 45 at each end, into which a center member 46 is adapted to telescope, see Figs. 4, 6 and 7. Each of these heads 45 is provided with an extension 47 which rests on top of the adjacent bar 38 and the vertically extending flange 35$^a$ of the longitudinal member 35 to which the particular bar 38 is secured. Each of the overhanging extensions 47 of the heads 45 is provided with a depending leg 47$^a$ which is tapped to receive a locking bolt 48. The flange 35$^a$ of each of the longitudinal members 35, 35 is spotted at predetermined intervals, as indicated at 35$^b$, for the reception of the ends of locking bolts 48.

On one side of each of the heads 45 is secured a short bar 39$^a$ which corresponds to the short bars 39, which are secured to the lateral extensions 36 of the longitudinal members 35, 35. Each of the short bars 39$^a$ is recessed at one side to provide a slot 41$^a$ corresponding to the slot 41, and its top recess 43$^a$ corresponds to the top recesses 43 in the short bars 39. The side bars 38, 38 are notched at predetermined intervals, as indicated at 49, in accordance with the spottings 35$^b$ in the flanges 35$^a$ of the longitudinal members 35. The grooves 41$^a$ are adapted to register with the notches or grooves 49 when the cross-bar 44 is moved to different positions intermediate the ends of the frame 30, for purposes hereinafter set forth.

Located below the frame 30 is a central longitudinally extending supporting beam 50 which is secured to, and is hung from, the end members 28, 28, by means of straps 51, 51. Parallel to and located at each side of the central beam 50 is another supporting beam 52, 52 respectively. Each of the beams 52 is supported at its opposite ends by straps 53, 53 which are secured to the lateral extensions 36, 36 of the longitudinal members 35, 35. The beams 50, 52, 52 are located in the same general horizontal plane as shown in Fig. 5.

Adjacent one end of the central supporting beam 50 is a fixed pedestal 55 which comprises legs 56, 56 secured at their lower ends to the bar 50 and at their upper ends to a short bar 57; and on each of the bars 52, 52 is a similar fixed pedestal 55$^a$ comprising legs 56$^a$, 56$^a$ and stop bars 57$^a$, 57$^a$.

Intermediate the fixed pedestal 55 on the beam 50 and the opposite end of the frame 30 is a movable pedestal 60 comprising legs 61, 61, tied together at their lower ends by a spacing member 62. The top ends of the legs 61, 61 are tied together by a top member 63. On each of the beams 52, 52 is a similar movable pedestal 60$^a$ comprising legs 61$^a$, 61$^a$ and top and bottom tie members 63$^a$ and 62$^a$ respectively.

Spanning the space between the fixed pedestal 55 and the movable pedestal 60 on the central supporting beam 50 is a bridge element 65 which is of channel or inverted U-shape cross-section. The ends of the bridge member 65 rest respectively on the pedestals 55 and 60, and is adapted to permit relative rectilineal adjustment of these elements, for purposes hereinafter set forth.

Rotatably mounted in, and extending between the corner posts 24, 24 at each end of the carriage 20 is a horizontally disposed shaft 66, 66ª respectively. Secured to each of said shafts adjacent each of the corner posts 24, 24 is a lever 67 which is connected by a link 68 to a bearing 69 secured to the under side of the end members 28, 28 of the frame 30. Intermediate the corner posts 24, 24 the shafts 66, 66ª are provided with levers 70, 70ª respectively, which are connected by a reach rod 71. The lever 70 on the shaft 66 is adapted to rest against the cross-bar 29, which is notched to receive the said lever, thus the movement of the lever 70 is limited in one direction which maintains the frame 30 in an elevated position. The shaft 66 is provided with a handle 72, by which the shafts 66, 66ª and levers 67, 67ª may be turned in a manner to lower the frame 30. A counterweight 73 is secured to the shaft 66 for counter-balancing the weight of the frame 30. Vertical movement of the frame 30 is provided for purposes hereinafter set forth.

The carriage 20 is movable longitudinally and, for this purpose, is provided with wheels 75, 75 which are rotatably mounted on transversely extending axles 76, 76 secured to the beams 21, 21 of the carriage. The wheels 75, 75 are adapted to run on rails 77, 77 (Fig. 3) which are tied together by tie members 78, 78; 79, 79, and 80, 80. This construction constitutes a primary carriage 85 which is adapted to be moved laterally, and for this purpose the ties 78, 78 and 79, 79 are equipped with flanged supporting wheels 81, 81 and 82, 82 respectively. The wheels 81, 81 and 82, 82 are adapted to run on rails 83, 83 and 84, 84 respectively.

The rails 83 and 84 are secured to the floor, or any other suitable rigid foundation, on which is also secured a pair of gear racks 86, 86, which extend parallel to the said rails 83 and 84. Gear wheels 87, 87 are adapted to mesh with the teeth of the gear racks 86, 86. The gears 87, 87 are secured to a shaft 88 which is rotatably mounted on the primary carriage 85.

Projecting laterally from one side of the primary carriage 85 is a platform 90, which is provided with a vertically extending bracket 91, which rotatably supports a shaft 92 on which is secured a sprocket wheel 93 and a hand wheel 94. The sprocket wheel 93 is operatively connected, by means of a sprocket chain 95, with a sprocket wheel 89 secured to the shaft 88 on the primary carriage 85.

Upon turning the hand wheel 94 the primary carriage 85 and the secondary carriage 20 may be moved laterally in either direction, for purposes hereinafter set forth.

Longitudinal movement of the secondary carriage 20 in either direction relative to the primary carriage 85 is accomplished by the following mechanism: extending longitudinally of the carriage 20 and secured to the under side of the end elements 22, 22 thereof is a gear rack 96, the teeth of which mesh with the teeth of a gear wheel 97. The gear 97 is splined to a shaft 98, which is rotatably mounted in bearings 99 secured to the floor or supporting platform on which the apparatus is mounted. The gear 97 is provided with a flange at either side which engage the sides of the rack 96, so that lateral movement of the rack 96 will slide the cooperating gear 97 longitudinally of the shaft 98.

Adjacent one end of the shaft 98 is provided a selective transmission mechanism 100, Figs. 8 and 9, which comprises a pair of ratchet wheels 101 and 102, which are splined to the shaft 98 and are adapted to be moved longitudinally of said shaft in a fixed and spaced relation to each other, so that either one or the other of said ratchet wheels 101, 102 may be moved into operative alignment with a cooperating pawl 103 and 104 respectively, or both of said ratchet wheels may be moved to the neutral position shown in Fig. 8.

The pawls 103 and 104 are pivotally mounted on levers 105, 106 respectively, which, in turn, are pivotally mounted on the shaft 98, intermediate the ratchet wheels 101, 102. To the free end of each of the pawl levers 105, 106 is pivotally attached one end of a link 107, 108 respectively, the opposite end of each of said links being pivotally attached to a vertically reciprocating cross-head 109, which is slidably mounted in stationary guideways 110, 110.

Reciprocation of the cross-head 109 is effected through a link 111, one end of which is pivotally attached to said cross-head, the opposite end of said link being provided with an eccentric strap 112 which encircles an eccentric 113 secured to a rotatable shaft 114. The shaft 114 is adapted to be rotated from any available source of power through a gear 115 secured to the shaft. The shaft 114 is rotatably mounted in bearings 116 secured to an elevated framework comprising a beam 117 which, as shown in the drawings, is an I beam.

The hubs of the ratchet wheels 101 and 102 are provided with annular grooves 118 and 119 respectively, which are adapted to receive the forked ends of yoke members 120, 121, which are secured to an axially slidable shift rod 122, slidably mounted in bearings 123, 123 in the framework of the transmission mechanism 100. The shift rod 122 is connected to one arm 124 of a bell-crank lever 125, the second arm 126 of which is connected by a link 127 to a lever 128, which is secured to one end of a rock shaft 129 rotatably mounted in fixed bearings 130, 130. A second lever 131 is splined to the rock shaft 129 and projects vertically through a slot 132 formed in the platform 90 of the primary carriage 85, said slot being provided with notches 133 which are adapted to receive the control lever 131 and retain it in the position to which it has been moved. Rocking of the shaft 129 will effect a movement of the ratchet wheels 101, 102 longitudinally of the shaft 98, so that either one or the other of said ratchet wheels 101, 102 will be brought into operative alignment with its cooperating pawl and thereby cause an intermittent rotation of the shaft 98, which through the gear 97 and rack 96 causes an intermittent longitudinal movement of the secondary carriage 20 relative to the primary carriage 85.

Intermediate the rails 84, 84, at one side of the carriages 20 and 85, is rigidly mounted an electric welding unit 135, which comprises a main body casting secured to angle bars 136, 137. These angle bars are secured at their opposite ends to the rails 84, 84, whereby the electric welding unit 135 is maintained in a stationary position. At the opposite side of the carriages 20 and 85 is a similar electric welding unit 135$^a$ the base of which is mounted on angle bars 136$^a$, 137$^a$, which extend parallel to the rails 84, 84, and connected by axles 138, 139, on which are secured flanged wheels 140, 140. The wheels 140 are adapted to run on the rails 84, 84.

On the axle 139 is secured a sprocket wheel 141, which is operatively connected by a sprocket chain 142 to a second sprocket wheel 143 rotatably mounted on a stud 144 secured in and projecting from the welding unit 135$^a$. A hand wheel 145 is secured to the sprocket wheel 144, and by turning this hand wheel the unit 135$^a$ may be moved toward or away from the unit 135, for purposes hereinafter set forth.

The electric welding units 135 and 135$^a$ are of well known construction and each comprises a fixed arm 146, 146$^a$ respectively, in each of which is mounted a relatively fixed lower electrode 147, 147$^a$. Each unit is provided with a second laterally extending arm 148, 148$^a$ in which is vertically slidably mounted a plunger 149, 149$^a$ which supports an upper electrode 150, 150$^a$. Current is supplied to the electrodes in the usual well-known manner.

The plungers 149, 149$^a$ are each connected at their upper ends to one end of a link 151, 151$^a$, respectively, the upper ends of said links being provided with eccentric straps 152, 152$^a$ which encircle eccentrics 153, 153$^a$ secured, in axial alignment with each other, to the shaft 114.

The eccentric 153$^a$ is splined to the shaft 114 and is positioned between bearings 116$^a$, 116$^a$ which slide on the shaft and are carried by a supplemental carriage 155, which is adapted to be moved longitudinally of the I beam 117, the said carriage being provided with wheels 156, 156 which ride the upper flange of the said I beam in the present instance.

The supplemental carriage 155 is rigidly connected to the movable welding unit 135$^a$ by brace members 157, 157, so that any movement of the said welding unit will cause a corresponding movement of the supplemental carriage 155.

Obviously, as the shaft 114 is rotated the eccentrics 153, 153$^a$ are rotated in unison causing the upper electrodes 150, 150$^a$ to descend toward the lower fixed electrodes 147, 147$^a$ to effect a spot welding of the metal elements of the panels placed intermediate the electrodes.

In operation, considering the assembling of a movable panel as indicated in Fig. 1, and Figs. 16 to 21 inclusive, the longitudinal side members 35, 35 of the frame 30 are adjusted to positions wherein the distance between the outside walls of the grooves 40, 40 corresponds to the overall width of the panel to be made. The cross-member 44 is then moved to a position wherein the distance between the outside walls of the grooves 41 and 41$^a$ correspond to the overall length of the panel to be made, the grooves 41$^a$ in the cross-member 44 being in alinement with certain of the notches or grooves 49 in the bars 38, 38 of the frame 30.

The movable pedestals 60, 60$^a$ and 60$^a$ and the bridge member 65 of the frame 30 are then moved along the supporting beams 50, 52 and 52 respectively to positions within the panel measurements, as denoted by the position of the cross-member 44.

The supplementary side Z plates 17, 17 are then placed on each side of the frame 30 with their upper horizontal webs 17$^a$, 17$^a$ resting in the respective cavities 42, 42 of the bars 38, as shown in Figs. 22 and 23. The supplementary end Z plates 15, 15 are then placed in position adjacent the ends of the side Z plates 17, 17 with their upper horizontal webs 15$^a$, 15$^a$ resting in the cavities 43, 43$^a$ of the bars 39, 39$^a$ respectively, and their lower horizontal webs 15$^b$, 15$^b$ resting on the lower horizontal webs 17$^b$, 17$^b$ of the side Z plates 17, 17 as indicated in Fig. 22.

Clamp plates 160, 160 are then placed at the respective corners of the panel being assembled. These clamp plates engage the upper horizontal webs of the Z plates 15 and 17 as indicated in Fig. 22 and by means of wing nuts 161 which are threaded onto bolts 162, which pass through openings 163 formed in the longitudinal members 35 of the frame 30. The clamp plates 160 are drawn down tightly onto the said webs, clamping them between the bars 38, 39 and 39$^a$ and the said clamp plates 160, so that the said side and end bars are held tightly in the frame 30.

The rear plate 14 is then placed on the lower webs 15$^b$, 15$^b$ and 17$^b$, 17$^b$ of the end and side Z bars 15 and 17 respectively as indicated in Fig. 23. The pedestals 55$^a$, 55$^a$, 60$^a$, 60$^a$ and the bridge member 65 engage the under side of the rear plate 14 to prevent its sagging in the center.

The primary carriage 85 is then manually moved laterally and the secondary carriage 20 moved longitudinally thereon until the electrodes 147, 150 of the fixed welding unit 135 are, respectively, positioned below and above a point lying substantially at the longitudinal center of the frame 30 and in vertical alignment with the center of the overlap of the rear plate 14 and the underlying horizontal web $15^b$ of the Z plate 15 at one end of frame 30, for example, as indicated at the point $x$, Fig. 22.

The movable welding unit $135^a$ is then moved, by operating the hand wheel 145, to a position wherein its electrodes $147^a$, $150^a$ are vertically aligned with the point $y$, Fig. 22.

Rotation of the shaft 114 is then effected to cause the upper electrodes 150, $150^a$ to descend to effect a spot welding of the elements lying between the said upper movable electrodes 150, $150^a$ and their respectively aligned lower stationary electrodes 147, $147^a$.

Continued rotation of the shaft 114 causes the upper electrodes to ascend and before these electrodes again descend the hand wheel 94 is operated and thereby moves the primary carriage 85, and consequently the frame 30 with the panel under construction, laterally until the points $x^1$ and $y^1$ are vertically aligned with the respective pairs of electrodes 147, 150 and $147^a$, $150^a$, whereupon the continued rotation of the shaft 114 causes the electrodes 150, $150^a$ to again descend to effect a spot welding at the point $x^1$ and $y^1$. This operation is repeated for each of the points $x^2$, $y^2$, etc., until the electrode 150 is in vertical alignment with the point $z$ and the electrode $150^a$ is in vertical alignment with the point $z^1$, and the welding at these points is effected.

Rotation of the shaft 114 is then stopped and the movable welding unit $135^a$ is returned to a position wherein the electrode $150^a$ is vertically aligned with the point $y$.

The operating lever 131 is then moved to bring the ratchet wheel 102 into operative alignment with the pawl 104 and the rotation of the shaft 114 is then renewed which causes the cross-head 109 to be elevated, and in so doing the pawl 104 engages the teeth of ratchet wheel 102 causing a rotation of the shaft 98 which through the gear 97 and rack 96 causes the secondary carriage 20 and the frame 30 to be moved longitudinally relative to the primary carriage 85, thereby bringing the electrodes 150, $150^a$ into vertical alignment with points $z^2$, $z^2$ along the respective longitudinal sides of the panel being constructed.

Continued rotation of the shaft 114 causes intermittent movements of the carriage 20 which alternate with the welding operations above described until the electrodes 150 and $150^a$ are in vertical alignment with points $z^{10}$ and $y^{10}$ respectively, whereupon rotation of the shaft 114 is discontinued and the movable welding unit $135^a$ is manually and laterally moved to a position wherein the electrode $150^a$ is in vertical alignment with the point $x, x$.

The rotation of the shaft 114 is again effected to intermittently raise and lower the electrodes 150, $150^a$ and between the welding operations thus effected the primary carriage 85 is moved laterally in intermittent steps to cause the said welding operations to be effected at predetermined spaced points along this end of the frame, until the electrode $150^a$ is in vertical alignment with the point $y^{10}$, and the electrode 150 is in vertical alignment with the point $zz$ and the welding at these points $y^{10}$ and $zz$ is accomplished, whereupon the rotation of the shaft 114 is stopped.

The clamps 160, 160 are then removed, the end and side Z plates 15 and 17 being now secured to the back plate 14 which keeps them in place.

The insulating material is then placed in the panel, after which the face plate 13 is placed over the assemblage with its edges overlapping the upper webs $15^a$, $15^a$ and $17^a$, $17^a$ of the respective end and side Z plates 15 and 17 as shown in Fig. 24.

The main end members 12, 12 are then placed on top of the face plate 13 with their flanges $12^a$, $12^a$ extending into the grooves 41 and $41^a$ respectively. The main side members 11, 11 are then placed on the assemblage with their flanges $11^a$, $11^a$ extending into the grooves 40, 40, and the ends of their horizontal webs $11^b$, $11^b$ overlapping the ends of the horizontal webs $12^b$, $12^b$ of the main end members 12.

At this stage of the operation the frame 30 is lowered to bring the under side of the horizontal webs $15^a$, $15^a$ and $17^a$, $17^a$ of the respective end and Z plates 15 and 17 into a position immediately overlying the upper ends of the lower electrodes 147, $147^a$, it being here understood that the primary carriage 85 has been moved laterally to bring the electrodes 147, 150 of the fixed welding unit into a position intermediate the vertical web $17^c$ of the adjacent side Z plate 17 and the outer edge of the horizontal web $17^a$ of said Z plate, and that the movable welding unit $135^a$ has been moved to bring its electrodes $147^a$ and $150^a$ into a corresponding position at the opposite side of the panel.

The lowering of the frame 30 with the assembled panel thereon is effected by turning the shaft 66 through the medium of the handle 72 thereon, the aggregate weight of the frame 30 and the panel carried thereby overcoming the counterweight 73 and thereby maintaining the said frame and panel in the lowered position, the slide blocks 27 resting on the upper ends of the corner posts 24 to support the frame in this position.

The welding operation is then continued in the same general manner as above described, first across one end of the panel and then simultaneously along the longitudinal sides thereof, and then across the opposite end. By this operation the horizontal webs 15$^a$ and 17$^a$ of the respective end and side Z plates 15 and 17, the face plate 13, and the respective end and side main members 12 and 11 are secured together to finish the assembling and welding of a movable panel, which may then be removed from the assembling table 30 in its complete and final form.

The assembling of a stationary panel such as shown in Figs. 10 to 15 inclusive is accomplished in the same general manner as above described relative to the assembling of a movable panel. In this case the main side members 1, 1 are placed on the frame 30 with their depending flanges 1$^a$ lying within the grooves 40, 40, and their upper horizontal webs 1$^b$ resting on top of the bars 38. The lower webs 1$^c$ of these Z bars 1 are longer than the upper horizontal webs 1$^b$ and lie between the bars 39, 39$^a$ as shown in Fig. 25, thus the said main side bars 1, 1 are positioned within the frame 30.

The main end members 2, 2 are then positioned in the frame 30 with the ends of their horizontal webs 2$^c$ overlapping the ends of the lower webs 1$^c$ of the main side members 1 and the flanges or vertical webs 2$^a$ of the end members 2 projecting upward and lying against the bars 39, 39$^a$ of the frame 30. The front plate 3 is then placed in position on the webs 1$^c$ and 2$^c$ of the main side and end members respectively.

With the frame 30 in its raised position the welding operation is carried on in the manner above noted in connection with the welding of the movable panel, thereby securing the face plate 3 to the horizontal webs 1$^c$ and 2$^c$ of the respective side and end members 1 and 2.

The insulating material 6 is then placed in position, after which the back plate 4 is placed over the assemblage with its opposite longitudinal edges overlapping the upper horizontal webs 1$^b$ of the main side members 1.

The frame 30 is then lowered and the welding operation is carried on along the longitudinal members 1, whereby the rear plate 4 is secured to the horizontal webs 1$^b$ of these main side members.

The supplementary Z plates 5 are then placed in position with their webs 5$^c$ overlapping the ends of the rear plate 4 and the ends of the webs 1$^c$ of the main side members 1. The web 5$^d$ of the Z plates 5 enclose the ends of the insulating material 6 and the webs 5$^b$ of said Z plates lie against the front or face plate 3.

After the said Z plates 5 have been positioned the carriages 85 and 20 and the movable welding unit 135$^a$ are manipulated in the manner above noted, with respect to the welding across the ends of the movable panel, and the webs 5$^b$ of the Z plates 5 are thereby welded to the end members 2 and the ends of the front plate 3 across the ends of the stationary panel.

From the above description it will be obvious that with our improved apparatus the various elements of which the panels are composed may be readily assembled in correct relation to each other, and while being maintained in this correct relationship may be readily, and to a great extent automatically, welded together to form a complete integral structure.

We claim:

1. In a panel assembling apparatus, the combination of a frame adapted to receive the elements of a panel in definite relation to each other, a secondary carriage for supporting said frame, a primary carriage for supporting said secondary carriage, means for moving said secondary carriage relative to said primary carriage and to said welding units, and means for moving said primary carriage relative to said welding units whereby the assembled panel elements may be welded together at predetermined points.

2. In a panel assembling apparatus, the combination of a frame adapted to receive the elements of a panel in definite relation to each other, a secondary carriage for supporting said frame, a primary carriage for supporting said secondary carriage, means for moving said secondary carriage in intermittent steps relative to said primary carriage and to said welding units, means for moving said primary carriage in intermittent steps and at right angles to the movement of said secondary carriage relative to said welding units, and means for operating said welding units between the intermittent movements of said carriages whereby the assembled panel elements may be welded together at predetermined points.

3. In a panel assembling apparatus, the combination of a frame adapted to receive the elements of a panel in definite relation to each other, a carriage for supporting said frame, welding units each having a fixed electrode and a movable electrode, means for raising and lowering said frame relative to said carriage and to the fixed electrodes of said welding units, means for moving said carriage in a definite path relative to said fixed electrodes, and means for operating said movable electrodes relative to said fixed electrodes and to the assembled panel elements, whereby the said panel elements may be welded together at predetermined points.

4. In a panel assembling apparatus, the combination of a frame adapted to receive the elements of a panel in definite relation to each other, a carriage for supporting said frame, welding units each having a fixed electrode and a relatively movable electrode, means for varying the elevation of said frame relative to said carriage and to said fixed electrodes, whereby the various elements of said panel occupying different horizontal planes may be placed between said fixed and movable electrodes, means for moving said carriage in intermittent steps relative to said electrodes with said frame in any one of its possible elevations, and means for operating said movable electrodes relative to said fixed electrodes whereby the panel elements lying between said electrodes may be welded together at predetermined points.

5. In a panel assembling apparatus, the combination of a frame adapted to receive the elements of a panel in definite relation to each other, a carriage for supporting said frame, welding units each having a fixed electrode and a relatively movable electrode, means for varying the elevation of said frame relative to said carriage and to said fixed electrodes, whereby the various elements of said panel occupying different horizontal planes may be placed between said fixed and movable electrodes, means for moving said carriage in intermittent steps relative to said electrodes with said frame in any one of its possible elevations, means for operating said movable electrodes relative to said fixed electrodes whereby the panel elements lying between said electrodes may be welded together at predetermined points, and a common operating means for said carriage moving means and said electrode operating means whereby their operations are performed in alternate succession.

6. In a panel assembling apparatus, the combination of a fixed welding unit and a relatively movable welding unit, a frame adapted to receive the elements of a panel in definite relation to each other located intermediate said welding units, a secondary carriage for supporting said frame, a primary carriage for supporting said secondary carriage, means for moving said secondary carriage longitudinally with respect to said welding units, means for moving said primary carriage laterally with respect to said welding units, and means for moving said movable welding unit toward and away from said fixed welding unit, whereby said panel element may be welded together at predetermined points.

7. In a panel assembling apparatus, the combination of a frame adapted to receive the elements of a panel in definite relation to each other, comprising a pair of end members, a pair of longitudinal side members adjustably mounted on said end members for movement transversely of said frame, a cross-member adjustably mounted in said side members for movement longitudinally of said frame, and means carried by said side members, said cross-member and one of said end members for holding the panel elements in said definite relationship.

8. In a panel assembling apparatus, the combination of a frame adapted to receive the elements of a panel in definite relation to each other, comprising a pair of end members, a pair of longitudinal side members adjustably mounted on said end members for movement transversely of said frame, a cross-member adjustably mounted in said side members for movement longitudinally of said frame, means carried by said side members, said cross-member, and one of said end members for holding said panel elements in said definite relationship, and means intermediate said frame members for supporting certain of said panel elements during the assembling operation.

9. In a panel assembling apparatus, the combination of a frame adapted to receive the elements of a panel in definite relation to each other, comprising a pair of end members, a pair of longitudinal side members adjustably mounted on said end members for movement transversely of said frame, a cross-member adjustably mounted in said side members for movement longitudinally of said frame, said side members, said cross-member, and one of said end members each being provided with a groove and a cavity extending parallel to the said members respectively, for receiving portions of certain of the panel elements whereby said panel elements are maintained in said definite relationship.

10. In a panel assembling apparatus, the combination of a frame adapted to receive the elements of a panel in definite relation to each other, comprising a pair of end members, a pair of longitudinal side members adjustably mounted on said end members for movement transversely of said frame, a cross-member adjustably mounted in said side members for movement longitudinally of said frame, said side members, said cross-member, and one of said end members each being provided with a groove and a cavity extending parallel to the said members respectively, for receiving portions of certain of the panel elements whereby said panel elements are maintained in said definite relationship, and said side members having transversely extending grooves adapted to register with the grooves of said cross-member.

11. In a panel assembling apparatus, the combination of a frame adapted to receive the elements of a panel in definite relation to each other, comprising a pair of end members, a pair of longitudinal side members adjustably mounted on said end members for movement transversely of said frame, a cross-member adjustably mounted in said side members for movement longitudinally of said frame, said side members, said cross-member, and one of said end members each being provided with a groove and a cavity extending parallel to the said members respectively, for receiving portions of certain of the panel elements whereby said panel elements are maintained in said definite relationship, said side members having transversely extending grooves adapted to register with the grooves of said cross-member, and means for locking said cross-member in its adjusted position on said side members.

12. In a panel assembling apparatus, the combination of a frame, adapted to receive the elements of a panel in definite relation to each other, comprising a pair of end members, a pair of longitudinal side members adjustably mounted on said end members for movement transversely of said frame, a cross-member adjustably mounted on said side members for movement longitudinally of said frame, means carried by said side members, said cross-member, and one of said end members for holding said panel elements in said definite relationship, a supporting member carried by said end members below the plane thereof, and a pedestal on said supporting member intermediate said frame members for engaging and supporting certain of said panel elements during the assembling operation.

13. In a panel assembling apparatus, the combination of a frame, adapted to receive the elements of a panel in definite relation to each other, comprising a pair of end members, a pair of longitudinal side members adjustably mounted on said end members for movement transversely of said frame, a cross-member adjustably mounted on said side members for movement longitudinally of said frame, means carried by said side members, said cross-member, and one of said end members for holding said panel elements in said definite relationship, a supporting member carried by said end members below the plane thereof, a fixed pedestal on said supporting member adjacent one end of said frame, and a movable pedestal on said supporting member adapted to be adjusted to various positions along said supporting member.

14. In a panel assembling apparatus, the combination of a frame, adapted to receive the elements of a panel in definite relation to each other, comprising a pair of end members, a pair of longitudinal side members adjustably mounted on said end members for movement transversely of said frame, a cross-member adjustably mounted on said side members for movement longitudinally of said frame, means carried by said side members, said cross-member, and one of said end members for holding said panel elements in said definite relationship, a supporting member carried by said end members below the plane thereof, a fixed pedestal on said supporting member adjacent one end of said frame, a movable pedestal on said supporting member adapted to be adjusted to various positions along said supporting member, and a bridge member carried by said pedestals and adapted for rectilineal adjustment relative thereto.

15. In a panel assembling apparatus, the combination of a frame, adapted to receive the elements of a panel in definite relation to each other, comprising a pair of end members, a pair of longitudinal side members adjustably mounted on said end members for movement transversely of said frame, a cross-member adjustably mounted on said side members for movement longitudinally of said frame, means carried by said side members, said cross-member, and one of said end members for holding said panel elements in said definite relationship, a supporting member carried by said end members below the plane thereof, a fixed pedestal on said supporting member adjacent one end of said frame, a movable pedestal on said supporting member adapted to be adjusted to various positions along said supporting member, a bridge member carried by said pedestals and adapted for rectilineal adjustment relative thereto, a similar supporting member carried by each of the said side members of the frame, a fixed pedestal on each of these latter supporting members, and an adjustable pedestal movably mounted on each of said latter supporting members.

WALTER M. SCHWARTZ.
ALMA J. HARRISON.
JOHN L. FAGAN.